United States Patent
Kuntz et al.

(10) Patent No.: US 8,573,035 B2
(45) Date of Patent: Nov. 5, 2013

(54) METHOD FOR MEASURING AND/OR TESTING WAVINESS OF A PLANAR TEXTILE

(75) Inventors: Julian Kuntz, Augsburg (DE); Jan Wessels, Aachen (DE); Frederik Lehners, Rendsburg (DE)

(73) Assignee: Airbus Operations GmbH, Hamburg (DE)

( * ) Notice: Subject to any disclaimer, the term of this patent is extended or adjusted under 35 U.S.C. 154(b) by 225 days.

(21) Appl. No.: 13/120,556

(22) PCT Filed: Sep. 30, 2009

(86) PCT No.: PCT/DE2009/001381
§ 371 (c)(1), (2), (4) Date: Jun. 20, 2011

(87) PCT Pub. No.: WO2010/037378
PCT Pub. Date: Apr. 8, 2010

(65) Prior Publication Data
US 2011/0247410 A1    Oct. 13, 2011

(30) Foreign Application Priority Data
Sep. 30, 2008   (DE) .......................... 10 2008 049 577

(51) Int. Cl.
*G01B 5/28* (2006.01)

(52) U.S. Cl.
USPC .......................................................... 73/104

(58) Field of Classification Search
None
See application file for complete search history.

(56) References Cited

U.S. PATENT DOCUMENTS

| | | | |
|---|---|---|---|
| 2,993,368 A * | 7/1961 | Schlein | 73/807 |
| 3,800,598 A | 4/1974 | Michel | |
| 4,951,497 A * | 8/1990 | Gilibert | 73/105 |
| 5,658,432 A * | 8/1997 | Heaven et al. | 162/198 |
| 2011/0011175 A1 * | 1/2011 | Ichikawa et al. | 73/159 |

FOREIGN PATENT DOCUMENTS

| DE | 41 34 174 C1 | 10/1992 |
|---|---|---|
| DE | 195 35 259 A1 | 3/1997 |

* cited by examiner

*Primary Examiner* — Robert R Raevis
(74) *Attorney, Agent, or Firm* — Whitham Curtis Christofferson & Cook, PC

(57) ABSTRACT

The invention relates to a method for measuring and/or testing a geometric design parameter, particularly waviness, of a planar textile (10), comprising the steps: disposing the planar textile (10) in an intermediate space (26) between a support (20) and a flexible film (22), applying a differential pressure (Δp) between the intermediate space (26) and the environment, so that the film (22) adapts to the planar textile (10), and capturing a surface profile (32) of the film (22).

13 Claims, 1 Drawing Sheet

METHOD FOR MEASURING AND/OR TESTING WAVINESS OF A PLANAR TEXTILE

Figure 1:
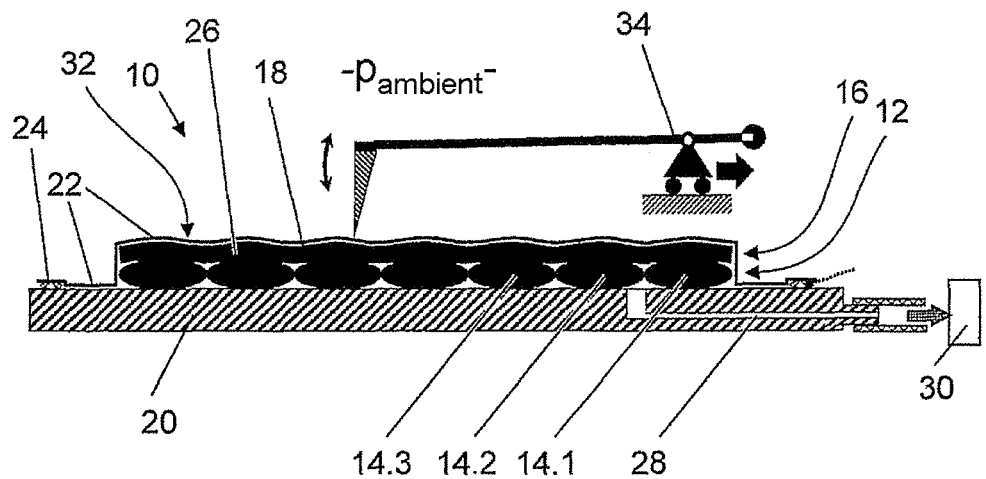

The invention relates to a method for measuring and/or testing waviness of a two-dimensional textile. According to a second aspect, the invention relates to a device for measuring and/or testing waviness of a two-dimensional textile, comprising a support for arranging the two-dimensional textile.

Two-dimensional textiles, i.e. textile two-dimensional structures, for example multiaxial fabrics, are used in particular for the production of fiber-reinforced plastic parts. It has been found that the strength of the future fiber-reinforced component is jointly influenced greatly by the uniformity of the two-dimensional textile used. It is therefore desirable to monitor the geometric design parameters, in particular the waviness, for example the layer waviness, of the two-dimensional textile so as to ensure that the fiber-reinforced component produced by using the two-dimensional textile has the desired strength.

Optical methods based on computer-assisted analyses of images of the two-dimensional textile are known. In the scope of such methods, images of the two-dimensional textile are recorded and particular geometric design parameters are determined by image evaluation software. A disadvantage with such methods is that, in particular, it is not possible to determine the layer waviness out of the plane.

In order to determine the geometric design parameter in the form of the layer waviness, that is to say the waviness of the two-dimensional textile out of the plane, it is known to cut up the finished component and determine the layer waviness on the cut piece. A disadvantage with this is that 100% testing is not possible, which is unsatisfactory in particular for safety components.

Document DE 195 35 259 A1 discloses a method and a device for measuring and/or testing a geometric design parameter of a two-dimensional textile, the two-dimensional textile being arranged on a support and the surface profile of the two-dimensional textile being recorded by scanning using a light line.

Document DE 19 01 979 A describes a method and a device for measuring the fine configuration, i.e. a geometric design parameter, of the grinding surface of a grinding belt, wherein the grinding belt is arranged between a support and a flexible film, a pressure is generated between the grinding belt and the film (by pressure blocks), so that the film adapts to the grinding belt, and the surface configuration of the film is recorded after the adaptation process has been carried out.

Document U.S. Pat. No. 4,951,497 A discloses a method and a device for measuring a geometric design parameter, in particular the roughness, of a surface, wherein a deformable element is arranged on the surface and application of a pressure between the element and the surface causes the element to adapt to the surface, so that the element is deformed on its side facing the surface and this deformation induces a deformation of the other side of the element, and the deformation of this side is recorded and evaluated as a measure of the geometric design parameter of the surface.

U.S. Pat. No. 3,500,598 A describes a method for measuring a geometric design parameter of an inner surface of a hollow body, a flexible film (in the form of a tube) being arranged in the cavity of a body and a pressure being applied between the body and the tube of film, so that the film adapts to the inner surface of the hollow body and the surface configuration of the latter is imparted to the film, and the surface profile of the film is recorded after the film has been removed from the body.

It is an object of the invention to measure geometric design parameters, in particular the waviness of a two-dimensional textile, nondestructively with high accuracy.

The invention achieves the object by a method for measuring or testing a geometric design parameter, in particular a layer waviness, of a two-dimensional textile, comprising the steps of (a) arranging the two-dimensional textile in an intermediate space between a base and a flexible film, (b) applying a differential pressure between the intermediate space and the environment, so that the film adapts to the two-dimensional textile, and (c) recording a surface profile of the film.

According to a second aspect, the invention achieves the object by a device according to the generic type, which has a film applicator device for applying a film, a differential application device for applying a differential pressure, so that the film adapts to the two-dimensional textile, and a surface profile recording device for recording a surface profile of the film.

An advantage of the invention is that 100% testing of the two-dimensional textile is possible. If the two-dimensional textile is a multiaxial fabric, then this multiaxial fabric comprises at least two layers of fibers or fiber bundles. The fiber bundles of a layer extend mutually parallel in a respective fiber direction, and the fiber bundles of neighboring layers form a nonzero angle with one another. It has been found that the strength of a fiber-reinforced construction component, which is produced by using the two-dimensional textile, depends greatly on the cross section of the individual fiber bundles. The more circular a fiber bundle is, the more pronounced is a waviness in the neighboring layers and the less is the strength of the finished fiber-reinforced construction component at the relevant position. Only by 100% testing is it therefore possible to ensure that the waviness, in particular the layer waviness, lies within a predetermined tolerance interval at all positions. The invention ensures this.

It is another advantage of the invention that it can be implemented with simple means. Flexible films can be produced inexpensively, for example in the form of a polyethylene film, so that only minor additional costs are entailed by applying the film.

It is also advantageous that the method according to the invention can be carried out very rapidly and with high process reliability. Unlike in the case of known methods, it is not necessary to tolerate the fact that for example a measurement sampler remains hanging on fibers of the two-dimensional textile. The invention can therefore also be used for continuous testing of the two-dimensional textile.

It is a further advantage that the possibility of 100% testing and the low costs allow continuous monitoring of the production of the two-dimensional textile. Disruptions in the process flow can therefore be identified and eliminated promptly, which increases the productivity of the production method.

In the scope of the present invention, the geometric design parameter is intended in particular to mean any characteristic quantity which characterizes the geometric extent of the two-dimensional textile out of the plane. The plane is the plane in which the two-dimensional textile extends at the position being measured. In particular, the geometric design parameter is a waviness, for example the layer waviness. The layer waviness is a measure of the deviation of the surface of the two-dimensional textile from a mating surface, and from a mating plane in the case of planar two-dimensional textiles. For the layer waviness, in particular configurational deviations which are of the order of magnitude of the spacing of two fiber bundles are considered. The layer waviness is therefore in particular a measure of the uniformity of the cross sections of the fiber bundles of a multiaxial fabric.

A two-dimensional textile is intended to mean not only textiles which extend along a mathematical plane, but also textiles which have a macroscopic curvature. So that the layer waviness can be determined, the curvature circle radius of the curvature of the two-dimensional textile is in this case large compared to a spacing of neighboring fibers, for example ten times as great.

The feature that the two-dimensional textile is arranged in an intermediate space between a gas-tight base and a flexible film is intended to mean that the two-dimensional textile is arranged between the base and the film so that application of the differential pressure leads to adaptation of the film onto the two-dimensional textile.

When the film is thicker and less flexible, the surface profile of the film reflects the surface profile of the two-dimensional textile commensurately less accurately. It is therefore favorable to select a film which is as thin as possible. On the other hand, with very thin films there is a risk that they will tear so that the differential pressure between the intermediate space and the environment cannot be applied with process reliability. The optimal thickness of the film will therefore be determined in preliminary tests, in which films with a decreasing thickness are used until using a film which is so thin that the method can no longer be carried out with process reliability. Then, for example, the thinnest film for which the method can just still be carried out with process reliability will be used.

The two-dimensional textile may in particular comprise films of carbon fibers. The film preferably has a thickness of less than 200 μm, since then it can adapt particularly well to the two-dimensional textile. Films made of polyolefin, for example polyethylene, are for example suitable.

According to a preferred embodiment, the base is gas-tight and the application of the differential pressure between the intermediate space and the environment involves evacuating the intermediate space. Such a method is particularly easy to carry out since, for example, it is merely necessary to provide openings in the base through which air can be extracted from the intermediate space. The film therefore bears particularly tightly on the two-dimensional textile and replicates the geometrical configuration of the two-dimensional textile particularly well.

The two-dimensional textile is preferably a multiaxial fabric, in particular a semifinished product. For example, the semifinished product is used for the production of aircraft components. Almost exclusively safety-relevant components are produced from such semifinished products, so that it is particularly advantageous to carry out 100% testing of the two-dimensional textile on which they are based.

Particularly preferably, the recording of the surface profile involves contactless scanning. This may for example be done by optical scanning, for example by means of laser or fringe projection methods.

As an alternative or in addition, it is also possible to carry out contact scanning, for example using a stylus instrument. Nevertheless, contactless methods have the advantage of being particularly fast. It is possible to select the film so that contactless scanning is particularly readily possible. For example, the film may be rendered nonreflective, so that measurement errors due to reflection can be suppressed.

Preferably, the recording of the surface profile is also carried out at least along one fiber orientation of the textile. It has been found that wavinesses measured along a fiber orientation provide a particularly good indication of any defects in the two-dimensional textile. If the two-dimensional textile is a multiaxial fabric, then there will be a plurality of fiber orientations, specifically one for each layer. The fiber orientation of a layer is the direction in which the fibers extend.

The method can be carried out particularly rapidly if the recording of the surface profile is carried out two-dimensionally. For the recording of surface profiles, the prior art discloses many methods by which the surface data can be recorded rapidly and accurately and these data can be evaluated. For example, a spatial Fourier transform may be carried out, in particular a fast Fourier transform, by which the proportion of configurational deviations which have a wavelength that lies in the range of the spacing of two neighboring fiber bundles of a multiaxial fabric is determined.

In order to test a two-dimensional textile, the method preferably comprises the steps of calculating a characteristic value, which describes the layer waviness, from the surface profile and comparing the characteristic value with a setpoint value. The characteristic value may for example be the dominant wavelength, local deviations from a predetermined setpoint contour, or a fiber angle. If the two-dimensional profile satisfies the requirements by lying within the predetermined setpoint value interval, then it can be assumed with high reliability that the fiber-reinforced component produced with the aid of the two-dimensional textile will have the desired strength properties.

According to a preferred embodiment, the method is a method for producing a composite component, a two-dimensional textile initially being provided and tested by a method according to the invention. Only if the two-dimensional textile corresponds to a predetermined specification will it be used for production of the fiber-reinforced component. To this end, the two-dimensional textile is impregnated with resin and the resin is subsequently set.

In a preferred device according to the invention, the film applicator device is formed so as to apply a revolving film. This means that there is for example a film loop, which revolves so that the same film is applied several times on the two-dimensional textile and used to carry out the method according to the invention. This saves on film material. It is, however, also possible to provide a roll of film so that each piece of film of the roll of film is only ever applied once onto a two-dimensional textile. A particularly high measurement accuracy can be achieved in this way. Such a method is advantageous in particular when particularly high-quality two-dimensional textiles are involved.

The support preferably comprises a device for applying a vacuum to an intermediate space between the applied textile and the film laid over it. This may for example involve small openings in the support, which are made so small that the two-dimensional textile is deformed only insubstantially by applying the vacuum. It is particularly favorable for such openings to be arranged so that a deformation which is caused by applying the vacuum can be separated from any material defects of the two-dimensional textile.

The invention will be explained in more detail below with the aid of two exemplary embodiments.

Figure 2:
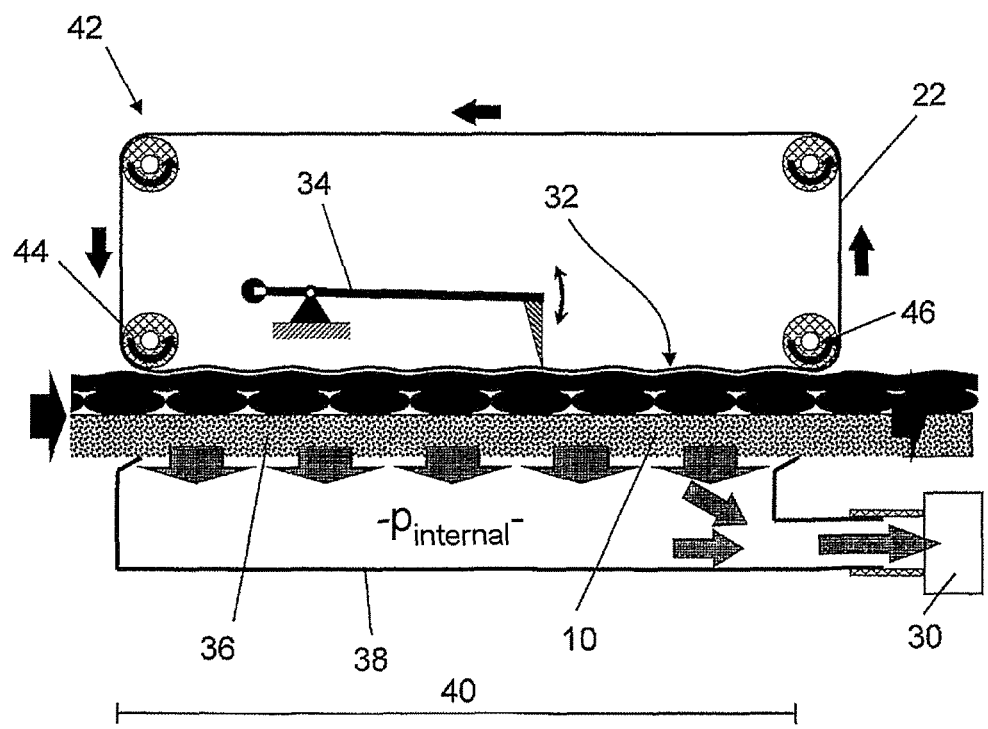

FIG. 1 shows a device according to the invention for carrying out a method according to the invention and FIG. 2 shows an alternative embodiment of a device according to the invention FIG. 1 shows a two-dimensional textile 10 in the form of a multiaxial fabric or a web of reinforcing fibers, for example carbon fibers. The two-dimensional textile 10 has a first layer 12 of a multiplicity of fiber bundles 14.1, 14.2, . . . , which extend mutually parallel and preferably all comprise the same number of carbon fibers (not visible in FIG. 1).

The two-dimensional textile 10 also comprises a second layer 16 of fiber bundles, of which only the fiber bundle 18 can be seen in the cross section. The fiber bundles 14 on the one hand and 18 on the other hand make a fiber angle (not shown) with one another. The two-dimensional textile 10 is a semifinished product which is impregnated in a subsequent processing step with a matrix material, for example a synthetic resin, so as to form a laminate. By setting in a mold, for example, aircraft parts are thus produced. The invention nevertheless relates to a method for producing an aircraft part or other structural components.

The two-dimensional textile 10 lies on a support 20, which is formed by a planar base plate that is as smooth as possible. A film 22 is placed around the two-dimensional textile 10 to be tested. The film 22 is a polyethylene film with a thickness of 12 μm. The film 22 is pressed onto the support 20 by means of sealing strips 24, or adhesively bonded to the base by sealing tapes 24, so as to form a gas-tight connection. An intermediate space 26, in which the two-dimensional textile 10 is arranged, is formed between the support 20 and the film 22.

By means of a vacuum application device in the form of a suction channel 28, the intermediate space 26 is connected to a vacuum pump 30 which sucks air continuously out of the intermediate space 26 so as to set up a differential pressure Δp of more than 800 mbar between an ambient pressure $p_{ambient}$ and an internal pressure $p_{internal}$ in the intermediate space 26. In particular, the ambient pressure is the atmospheric pressure of approximately 1030 mbar and the internal pressure is less than 200 mbar, in particular less than 100 mbar. In the present case, an internal pressure of $p_{internal}$=50 mbar is applied. It would, however, also be possible to increase the ambient pressure $p_{ambient}$ by fitting a pressure bell on top.

Owing to the application of the negative pressure to the intermediate space 26, the film 22 adapts tightly to the two-dimensional textile 10 and compresses it in the thickness direction, so that a surface profile 32 is formed. Local textile thickness differences or thickness deviations from the ideal shape, or irregularities in the fiber quantity distribution, stand out clearly on the surface profile 32 of the film 22. The suction of the film 22 onto the two-dimensional textile also generates a fixed structure which no longer slips, having a wavy but uninterrupted surface which is linearly scanned in a subsequent working step by a surface profile recording device in the form of a measurement sampler 34. As an alternative, an optically nontransparent film 22 is used which has suitable backscattering properties so that contactless optical measurement devices can also be used. For example, it is advantageous for the film to be reflection-free.

Using the measurement sampler 34, the surface profile 32 of the film 22 is now recorded, particularly in different directions of the two-dimensional textile 10, and sent via an interface (not shown) to a computer (likewise not shown) which processes the data. This computer may for example carry out a Fourier transform and/or filtering. From the measured surface profile 32, information about dominant wavelengths or angle deviations of the fiber layers 12, 16 is then calculated and compared with predetermined limit values. Information about the quality of the two-dimensional textile can thereby be obtained. If the geometric design parameters, for example said dominant wavelengths or angle deviations, lie within the limit values, then the two-dimensional textile 10 is deemed suitable and continues to be used for further production. Otherwise, the two-dimensional textile 10 is rejected.

The vacuum pump 30 and the corresponding connection via the suction channel 28 to the intermediate space 26 are part of a differential pressure application device.

FIG. 2 shows a second exemplary embodiment of a device according to the invention, in which the surface profile recording device in the form of the measurement sampler 34 is not moved relative to the support 20, but rather in which the two-dimensional textile 10 lies on a conveyor device 36, for example on a conveyor belt made of an air-permeable material. The conveyor device conveys the two-dimensional textile 10 constantly forward and the differential pressure application device in the form of the vacuum pump 30 continuously applies a negative pressure onto a surface section 40 of the two-dimensional textile by means of a vacuum chamber 38. The vacuum pump 30 is configured in such a way that air flowing in from the sides is extracted, so that an internal pressure $p_{internal}$ of less than 200 mbar is set up in the vacuum chamber 38.

On the opposite side from the vacuum chamber 38, there is a film applicator device 42 which applies a revolving film 22 onto the two-dimensional textile by means of an application roll 44, and removes it again from the two-dimensional textile 10 by means of a removal roll. The surface profile recording device in the form of the measurement sampler 34 is arranged between the application roll 44 and the removal roll 46, which is stationary relative to the vacuum chamber 38 and constantly records the surface profile 32. The measurement machine shown in FIG. 2 is preferably part of a textile production line and allows 100% testing of the two-dimensional textile 10 being produced. This allows malfunctions during production of the two-dimensional textile 10 to be identified with a very short time delay and eliminated promptly.

LIST OF REFERENCES

10 two-dimensional textile
12 first layer
14 fiber bundle
16 second layer
18 fiber bundle
20 support
22 film
24 sealing strip or sealing tape
26 intermediate space
28 suction channel
30 vacuum pump
32 surface profile
34 measurement sampler
36 conveyor device
38 vacuum chamber
40 surface section
42 film applicator device
44 application roll
46 removal roll
$P_{ambient}$ ambient pressure
$P_{internal}$ internal pressure
Δp pressure difference

The invention claimed is:

1. A method for measuring and/or testing a geometric design parameter of a two-dimensional textile, comprising the steps of:
    (a) arranging the two-dimensional textile in an intermediate space between a support and a flexible film,
    (b) applying a differential pressure between the intermediate space and an environment, so that the flexible film adapts to the two-dimensional textile, and
    (c) recording a surface profile of the flexible film.

2. The method as claimed in claim 1, wherein the support is gas-tight and the application of the differential pressure between the intermediate space and the environment involves evacuating the intermediate space.

3. The method as claimed in claim 1, wherein the two-dimensional textile is a multiaxial fabric.

4. The method as claimed in claim 1, wherein the recording of the surface profile involves contactless scanning.

5. The method as claimed in claim 1, wherein the recording of the surface profile is carried out at least along one fiber orientation of the two-dimensional textile.

6. The method as claimed in claim 1, wherein the recording of the surface profile is carried out two-dimensionally.

7. The method as claimed in claim 1, further comprising the steps of:
   (d) calculating a characteristic value for the geometric design parameter from the surface profile and
   (e) comparing the characteristic value with a setpoint value interval.

8. A method for producing a fiber composite component, comprising the steps of:
   (a) arranging a two-dimensional textile in an intermediate space between a support and a flexible film,
   (b) applying a differential pressure between the intermediate space and an environment, so that the flexible film adapts to the two-dimensional textile,
   (c) recording a surface profile of the flexible film,
   (d) calculating a characteristic value, which describes a layer waviness, from the surface profile,
   (e) comparing the characteristic value with a setpoint value interval, and
   (f) incorporating the two-dimensional textile into a fiber composite component only if the characteristic value lies within a predetermined setpoint value interval.

9. A device for measuring and/or testing waviness of a two-dimensional textile, comprising
   (i) a support for arranging the two-dimensional textile,
   (ii) a film applicator device for applying a film,
   (iii) a differential pressure application device for applying a differential pressure, so that the film adapts to the two-dimensional textile, and
   (iv) a surface profile recording device for recording a surface profile of the film.

10. The device as claimed in claim 9, wherein the film applicator device is configured to apply a revolving film.

11. The device as claimed in claim 9, wherein the support comprises a device for applying a vacuum to an intermediate space between the applied textile and the film laid over it.

12. The method as claimed in claim 1, wherein the geometric design parameter is waviness.

13. The method as claimed in claim 7, wherein the characteristic value describes a layer waviness.

* * * * *